United States Patent
Strauß et al.

(10) Patent No.: US 11,636,767 B2
(45) Date of Patent: Apr. 25, 2023

(54) METHOD FOR THE AUTOMATIC TRANSVERSE GUIDANCE OF A FOLLOWING VEHICLE IN A VEHICLE PLATOON

(71) Applicant: MAN Truck & Bus SE, Munich (DE)

(72) Inventors: Peter Strauß, Munich (DE); Walter Schwertberger, Althegnenberg (DE); Oliver Gebauer, Schwabhausen (DE)

(73) Assignee: MAN TRUCK & BUS SE, Munich (DE)

( * ) Notice: Subject to any disclaimer, the term of this patent is extended or adjusted under 35 U.S.C. 154(b) by 325 days.

(21) Appl. No.: 16/447,490

(22) Filed: Jun. 20, 2019

(65) Prior Publication Data

US 2019/0392715 A1 Dec. 26, 2019

(30) Foreign Application Priority Data

Jun. 20, 2018 (DE) ...................... 10 2018 114 808.9

(51) Int. Cl.
*G08G 1/00* (2006.01)
*B60W 30/12* (2020.01)
(Continued)

(52) U.S. Cl.
CPC ............... *G08G 1/22* (2013.01); *B60W 30/12* (2013.01); *B60W 30/165* (2013.01); *G06V 20/588* (2022.01); *G08G 1/167* (2013.01)

(58) Field of Classification Search
CPC ............... G05D 1/0293; G05D 1/0295; G05D 2201/0213; G05D 1/0274; G05D 1/0246; G08G 1/22; G08G 1/167; G08G 1/123; G08G 1/096805; G08G 1/0969; G08G 1/20; B60W 30/165; B60W 30/12; B60W 40/04; B60W 10/20; B60W 40/02; G06K 9/00798; G06K 9/6288; G01S 19/41; G06F 17/10

See application file for complete search history.

(56) References Cited

U.S. PATENT DOCUMENTS

| | | | |
|---|---|---|---|
| 2012/0022739 A1* | 1/2012 | Zeng | ..................... B60W 30/12 348/148 |
| 2015/0127189 A1* | 5/2015 | Mehr | ................. B60W 30/165 701/1 |

(Continued)

FOREIGN PATENT DOCUMENTS

| | | |
|---|---|---|
| DE | 102006040334 A1 | 3/2008 |
| DE | 102010020984 A1 | 10/2011 |

(Continued)

*Primary Examiner* — Kenneth J Malkowski
(74) *Attorney, Agent, or Firm* — Weber Rosselli & Cannon LLP

(57) ABSTRACT

The present disclosure relates to a method for the automatic transverse guidance of a following vehicle in a vehicle platoon. The method comprises determining and receiving a plurality of lane data. A lane course is able to be determined on the basis of the plurality of lane data and the following vehicle is able to be transversely guided on the basis of the determined lane course. The method is able to prevent an increase in swaying movements from the front to the rear in the vehicle platoon. In addition, the vehicles of the vehicle platoon are able to remain in the starting lane, even when a vehicle of the vehicle platform driving in front changes lane.

18 Claims, 1 Drawing Sheet

(51) Int. Cl.
*B60W 30/165* (2020.01)
*G08G 1/16* (2006.01)
*G06V 20/56* (2022.01)

(56) References Cited

U.S. PATENT DOCUMENTS

2016/0292998 A1* 10/2016 Obuchi ................ G05D 1/0287
2020/0241563 A1* 7/2020 Van Der Knaap ....... G08G 1/22

FOREIGN PATENT DOCUMENTS

| DE | 102012208256 A1 | 11/2013 | | |
|---|---|---|---|---|
| DE | 102014002114 A1 | 8/2015 | | |
| DE | 102016204593 A1 | 10/2016 | | |
| WO | 2017148516 A1 | 9/2017 | | |
| WO | WO-2017148516 A1 * | 9/2017 | ............... | G08G 1/22 |

* cited by examiner

METHOD FOR THE AUTOMATIC TRANSVERSE GUIDANCE OF A FOLLOWING VEHICLE IN A VEHICLE PLATOON

BACKGROUND

The present disclosure relates to a method for the automatic transverse guidance of a following vehicle in a vehicle platoon. The present disclosure relates in particular to a method for determining a traffic lane reference course (lane course) in order to stabilize automatic transverse guidance of one or more following vehicles in a vehicle platoon.

In platooning, a lead vehicle is automatically followed at a short distance by one or more following vehicles in a convoy of vehicles, with electronic coupling of the vehicles. The automation and communication between the vehicles enables driving at extremely short distances between the platoon participants.

Conventional methods for the automatic transverse guidance of modern motor vehicles are based to a considerable extent on the sensor-assisted detection and tracking of lane markings. Since however, in particular in the case of platooning, these are often able to be detected by sensors only insufficiently or even not at all due to the visual conditions when following at a short distance, modern platoon transverse control systems are often implemented in the form of an object follower control system in which the transverse control strategy consists in aligning the specific vehicle with the middle of the rear of the respective vehicle in front through suitable steering interventions.

This may in principle give rise to two disadvantages. Firstly, swaying movements of the trailers or vehicle trailers of the vehicles that are involved may increase from the front to the rear due to the inertias of the vehicle transverse movement. Secondly, when a lead vehicle or vehicle driving at the front of the vehicle platoon changes lane, the entire following platoon may follow this lane change. The driver of the vehicle changing lane therefore has to ensure that it is also possible for a plurality of following platoon vehicles to change lane to the adjacent lane without danger, which is increasingly challenging with an increasing platoon length. This problem could be alleviated by sensor-based rear-area monitoring with free space recognition, but this would be connected with increased technical expenditure and additional costs.

DE 10 2014 002 114 A1 additionally discloses a method for operating a vehicle system, designed for at least partly automatic vehicle guidance, of a motor vehicle. A longitudinal guidance intervention and a transverse guidance intervention are determined taking into account surroundings data of the motor vehicle that describe the surroundings of the motor vehicle. By evaluating the surroundings data, a statistically descriptive item of convoy information about a convoy driving in front of the motor vehicle is determined. The transverse guidance intervention and the longitudinal guidance intervention are determined taking into account the item of convoy information.

SUMMARY

The present disclosure is based on the object of providing an alternative and/or improved method for the automatic transverse guidance of a following vehicle in a vehicle platoon, by way of which method disadvantages from the prior art are advantageously able to be overcome. The intention is preferably to provide a novel approach to determining the traffic lane course as a reference or target trajectory for the transverse control, by way of which automatic transverse guidance is able to be improved, in particular stabilized.

The object is achieved by the features of the independent claims. Advantageous developments are specified in the dependent claims and in the description.

The method is used for the automatic transverse guidance of a following vehicle in a vehicle platoon (for example formed from a plurality of electronically coupled motor vehicles that are preferably following one another at a short distance on a traffic lane). The method comprises determining first lane data from map information (for example digital map; available online or offline) and (for example current) position information of the following vehicle. The method comprises determining second lane data from a detection of lane markings (for example on a road) by the following vehicle. The method comprises determining third lane data from object tracking detection of one or more vehicles, driving in front of the following vehicle, of the vehicle platoon. The method comprises receiving fourth lane data from a detection of lane markings by a lead vehicle of the vehicle platoon. The method comprises determining a (main or reference) lane course (for example outer lane boundaries of the lane course) on the basis of the first lane data, the second lane data, the third lane data and/or the fourth lane data. The method comprises automatic transverse guidance (for example steering and/or transverse control) of the following vehicle on the basis of the determined lane course.

The method makes it possible to determine a fused traffic lane course or lane course that is able to be used for the following vehicle as a reference for the transverse movement. The fused lane course may be determined by each vehicle (up to the lead vehicle) of the vehicle platoon and used as a reference. As a result, swaying movements from the front to the rear in the vehicle platoon are not increased. In addition, the vehicles of the vehicle platoon are able to remain in the starting lane, even when the lead vehicle changes lane, and are possibly automatically braked to a standstill or until the driver takes over if the lead vehicle moves out of the field of view of the immediately following vehicle. If a vehicle for example in the middle of the platoon pulls out, then the following vehicles are able to catch up with the next platoon vehicle without impairing the transverse guidance. The method likewise allows, in the event of an intended lane change, a specification of an alternative traffic lane, which specification is likewise not directly or not exclusively dependent on the rear of a lead vehicle, should this be necessary for example in a merging area, etc.

In one particularly preferred embodiment, the first lane data are determined as a mathematical model in the form of a first lane course hypothesis, preferably in the form of a mathematical polynomial and/or of a clothoid model, and/or the second lane data are determined as a mathematical model in the form of a second lane course hypothesis, preferably in the form of a mathematical polynomial and/or of a clothoid model. As an alternative or in addition, the third lane data are determined as a mathematical model in the form of a third lane course hypothesis, preferably in the form of a mathematical polynomial and/or of a clothoid model, and/or the fourth lane data are determined as a mathematical model in the form of a fourth lane course hypothesis, preferably in the form of a mathematical polynomial and/or of a clothoid model. It is also possible for the (main or reference) lane course to be determined as a mathematical model in the form of a lane course hypothesis, preferably in the form of a mathematical polynomial and/or of a clothoid model.

In a further embodiment, depending on the availability of the lane data, one, two, three or all of the first lane data, the second lane data, the third lane data and the fourth lane data are taken into account to in order to determine the lane course. The determined lane course is preferably used as a target trajectory for automatic transverse guidance of the following vehicle.

The first, second, third and/or fourth lane data may expediently contain information about a lane width, a lane length, a lane course, a lane boundary, a lane curvature, a road width, a road length, a road course, a road boundary and/or a road curvature. When specifying the lane data, preferably the lane hypotheses, in a coordinate system fixed with respect to the vehicle, information about the relative position and about the relative angle between the vehicle longitudinal axis with respect to points along the lane data, preferably lane hypotheses, is additionally present.

By way of example, the vehicles of the vehicle platoon, while performing the method, may be in a platooning mode with (for example bidirectional) electronic coupling (electronic drawbar) between the vehicles of the vehicle platoon.

In one exemplary embodiment, determining the first lane data may comprise locating the following vehicle on a (for example digital) map by way of a satellite-assisted position determination system (GNSS) and/or of a navigation system of the following vehicle. The accuracy of the GNSS positioning may advantageously, but not necessarily, be increased using correction data (DGPS). The availability of the GNSS positioning may advantageously, but not necessarily, be improved by incorporating odometry data. Location within a traffic lane of the digital map may be assisted by applying map-matching methods, for example using road markings detected using sensors. It is also possible for a traffic lane of the following vehicle and/or a position of the following vehicle in the traffic lane to be determined from the map information and the position information of the following vehicle (for example by the navigation system of the following vehicle). By way of example, the first lane data may then be provided by the navigation device by way of the map information. By way of example, a traffic lane hypothesis of the following vehicle and/or a traffic lane assignment of the following vehicle in the traffic lane may be determined from the map information and the position information of the following vehicle by way of coordinate transformation into a coordinate system fixed with respect to the vehicle. By way of example, the first lane course hypothesis may then be provided by way of the map information.

In a further exemplary embodiment, determining the second lane data comprises detecting lane markings and/or unmarked road boundaries by way of a preferably camera-assisted lane marking detection system of the following vehicle. As an alternative or in addition, determining the second lane data comprises applying image recognition in order to recognize lane markings and/or unmarked road boundaries on one or more recordings, captured by a lane marking detection system of the following vehicle, of preferably upcoming surroundings of the following vehicle.

In a further exemplary embodiment, determining the third lane data comprises performing object tracking detection by way of object recognition of a preferably sensor-fused (for example a plurality of sensors from which data are fused), camera-assisted, lidar-assisted, radar-assisted and/or satellite position determination-assisted object tracking detection system of the following vehicle. It is also possible for a previous and/or future (predicted) estimated (for example extrapolated) trajectory of the one or more vehicles driving in front to be determined, and/or for a transverse movement and/or direction of travel indication from the one or more vehicles driving in front to be detected.

In a further exemplary embodiment, determining the fourth lane data comprises detecting lane markings by way of a camera-assisted lane marking detection system of the lead vehicle and/or applying image recognition in order to recognize lane markings on one or more recordings, captured by a lane marking detection system of the lead vehicle, of preferably upcoming surroundings of the lead vehicle. In this case, it is possible for a coordinate transformation to be calculated in order to calculate the lane data, preferably the lane course hypothesis, in coordinates fixed with respect to the vehicle. It is possible for the fourth lane data to be transmitted to one or more following vehicles via car-to-car communication and to be converted there into the respective coordinate system fixed with respect to the vehicle through coordinate transformation. In a further embodiment, the output data of the lane recognition in the lead vehicle may be transmitted directly to one or more following vehicles and used there to calculate a lane course hypothesis.

In one embodiment, the lane course is determined as a fused lane course from the first lane data (for example the first lane course hypothesis), the second lane data (for example the second lane course hypothesis), the third lane data (for example the third lane course hypothesis) and/or the fourth lane data (for example the fourth lane course hypothesis).

In a further embodiment, the first lane data (for example the first lane course hypothesis), the second lane data (for example the second lane course hypothesis), the third lane data (for example the third lane course hypothesis) and/or the fourth lane data (for example the fourth lane course hypothesis) are each weighted with a weight in order to determine the lane course. It is possible, for the calculation of the dynamic weights, to use the covariances of the individual filters for the hypothesis calculation and/or knowledge about the current availability/quality of the respective input data in the form of explicit, for example from self-diagnosis of the systems that are involved, or implicit knowledge, for example using the present road situation and heuristic connections or empirical values about the reliability of the respective information sources in the respective situation.

It is possible for a first weight for the first lane data (for example the first lane course hypothesis), a second weight for the second lane data (for example the second lane course hypothesis), a third weight for the third lane data (for example the third lane course hypothesis) and/or a fourth weight for the fourth lane data (for example the fourth lane course hypothesis) to be changeable (for example within specifically or generally predefined range limits) or unchangeable.

In one development, the first weight, the second weight, the third weight and/or the fourth weight is determined or predefined by covariance matrices of the filters that are respectively used (for example individual filters) in order to determine the respective lane data (for example lane hypotheses), such as for example Kalman filters.

In addition or as an alternative, the first weight, the second weight, the third weight and/or the fourth weight is determined or predefined (for example changeably) on the basis of a determined quality of the respective determination of the first lane data, of the second lane data, of the third lane data and/or of the fourth lane data.

In a further embodiment, the first weight is determined (for example changeably) on the basis of a number of available satellites, of a reported integrity of the determined position data of the following vehicle, of an availability of a differential global positioning system and/or of a resolution of the map information.

In a further embodiment, the second weight is determined on the basis of a distance between the following vehicle and a vehicle, driving for example directly in front of the following vehicle, of the vehicle platoon, of a size of a field of view, not covered by the vehicle driving directly in front, of a lane marking detection system of the following vehicle, of a detected length of the lane markings and/or of a detected presence of the lane markings.

In a further embodiment, the third weight is determined on the basis of a number of evaluated systems (for example camera system, lidar system and/or radar system of the following vehicle and/or position determination vehicle of the vehicle driving in front) and for example the respective confidences or the tracking duration, of a length of a determined previous and/or future estimated (for example extrapolated) trajectory of the one or more vehicles driving in front, of a number of measurement points and/or of a detection of a change of direction of travel signal from the one or more vehicles driving in front.

In a further embodiment, the fourth weight is determined on the basis of a distance between the lead vehicle and a vehicle driving directly in front of the lead vehicle, of a size of a field of view, not covered by the vehicle driving directly in front, of a lane marking detection system of the lead vehicle, of a detected length of the lane markings and/or of a detected presence of the lane markings.

By way of example, in one embodiment, all of the lane course data (for example lane course hypotheses) may be provided with timestamps of a synchronized clock and/or a clock that is identical in all of the vehicles (for example GNSS time). In this case, for example, the time of the sensor-based detection of a surrounding object or of a GNSS position may be decisive. It is possible, through prediction or retrodiction of the data in a filtering step, to convert the individual lane data (lane hypotheses) to a common time and thus to increase the quality of the fused traffic lane model.

In one exemplary embodiment, the method comprises applying a coordinate transformation to the fourth lane data (for example the fourth lane hypothesis) that relate to the lead vehicle for comparison with the first, second and/or third lane data (for example lane hypotheses) that relate to the following vehicle.

In a further exemplary embodiment, the lane course, the first lane data (for example the first lane hypothesis), the second lane data (for example the second lane hypothesis) and/or the third lane data (for example the third lane hypothesis) are determined by the following vehicle and/or the fourth lane data (for example the fourth lane hypothesis) are determined by the lead vehicle or by the following vehicle.

In one variant embodiment, the fourth lane data (for example the fourth lane hypothesis) are transmitted from the lead vehicle to the following vehicle by way of vehicle-to-vehicle communication (for example by way of a communication interface of the lead vehicle and a communication interface of the following vehicle).

In a further variant embodiment, the first lane hypothesis, the second lane hypothesis, the third lane hypothesis and/or the fourth lane hypothesis are formed as a lane polynomial or clothoid model and/or the (main) lane course is formed as a fused and/or merged lane hypothesis of the first, second, third and fourth lane data.

A lane polynomial may expediently approximate a lane course in the form of a mathematical polynomial. As an alternative, clothoid models may be used, for example.

The present disclosure also relates to a motor vehicle, preferably a utility vehicle (for example lorry or bus), having a control unit that is designed to execute a method as disclosed herein.

The motor vehicle may expediently be the following vehicle in accordance with the method.

The term "control unit" may relate in particular to a set of electronics and/or a mechanical controller, which, depending on the embodiment, is able to perform open-loop control tasks and/or closed-loop control tasks. Even where the term "control" is used herein, this may expediently also encompass "closed-loop control" or "control with feedback".

In one development, the motor vehicle has a navigation system containing the map information, a satellite-assisted (for example not necessarily differential) position determination system for determining a position of the motor vehicle, a preferably camera-assisted lane marking detection system for detecting lane markings and/or unmarked road boundaries on a road, a preferably camera-assisted, radar-assisted, lidar-assisted and/or satellite position determination-assisted object tracking detection system for the tracking detection of one or more vehicles driving in front and/or a communication interface for vehicle-to-vehicle communication with the lead vehicle.

BRIEF DESCRIPTION OF THE DRAWINGS

The above-described preferred embodiments and features of the present disclosure may be combined with one another in any desired manner. Further details and advantages of the embodiments and features of the present disclosure will be described below with reference to the appended drawings. In the drawings.

DETAILED DESCRIPTION

The embodiments shown in the figures at least partially correspond, and therefore similar or identical parts are denoted with the same reference signs, and for the explanation of said parts, reference is also made to the description of the other embodiments or figures in order to avoid repetitions.

Figure 1:
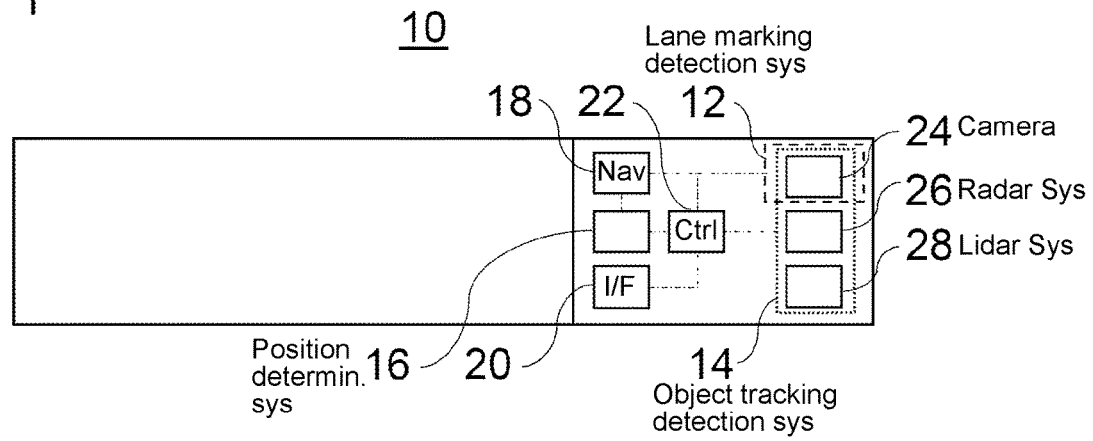
FIG. 1 shows a schematic plan view of a motor vehicle in accordance with the present disclosure.

FIG. 1 shows a motor vehicle 10. The motor vehicle 10 may in particular be a utility vehicle, preferably a lorry or a bus.

The motor vehicle 10 has a plurality of components that are able to be used for the automatic transverse guidance of the motor vehicle 10 in a vehicle platoon. The motor vehicle 10 may in particular have a lane marking detection system 12, an object tracking detection system 14, a position determination system 16, a navigation system (for example a module for self-location within a digital map) 18 and/or a communication interface 20. The motor vehicle 10 additionally has a control unit 22. The lane marking detection system 12, the object tracking detection system 14, the position determination system 16, the navigation system 18 and/or the communication interface 20 may communicate with one another and/or the control unit 22 in a wired or wireless manner.

The lane marking detection system 12 has a camera system 24. The camera system 24 may record a moving image (that is to say a plurality of temporally consecutive recordings) of surroundings of the motor vehicle 10. The camera system 24 may have one or more video cameras. The camera system 24 may in particular be directed towards surroundings to the side of the motor vehicle 10 and/or in front of the motor vehicle 10 in relation to a forward direction of travel of the motor vehicle. By applying an image recognition method, it is possible to recognize lane markings on a road, if they are present, in the moving image from the camera system 24.

The object tracking detection system 14 comprises for example the camera system 24, a radar system 26 and a lidar system 28. The object tracking detection system 14 fuses sensor data from the camera system 24, the radar system 26 and the lidar system 28. The object tracking detection system 14 is configured so as to determine a relative distance between the motor vehicle 10 and a motor vehicle driving in front in the x-direction (longitudinal direction) and the y-direction (transverse direction) of the motor vehicle 10. The object tracking detection system 14 may for example perform object tracking in relation to the motor vehicle driving in front, for example by applying image recognition methods. It is also possible for the object tracking detection system 14 to be able to determine the relative distance from a plurality of motor vehicles driving in front. The object tracking detection system 14 may have alternative and/or additional object tracking detection systems. By way of example, a position or a position course of the motor vehicle driving in front may be determined by the motor vehicle 10 receiving corresponding position data of the motor vehicle driving in front from the vehicle driving in front by way of the communication interface 20.

The position determination system 16 is a satellite-assisted position determination system. The position determination system 16 may be for example a GPS system. The position determination system 16 receives data from a plurality of satellites, from which data a global position of the motor vehicle 10 is able to be determined.

The navigation system 18 has a memory containing map information about surroundings of the motor vehicle 10. The map information contain a digital map of the surroundings and lane information in relation to a number, a course, a direction and a width of traffic lanes of the roads of the digital map. By incorporating the positions, determined using the position determination system 16, of the motor vehicle 10, it is possible to determine a position of the motor vehicle 10 on the digital map. It is possible in particular to determine a lane position of the motor vehicle 10 on a road of the digital map.

The communication interface 20 is configured for bidirectional communication with communication interfaces of other motor vehicles, in particular in the vehicle platoon. In other words, the communication interface 20 is a vehicle-to-vehicle communication interface.

To this end, the control unit 22 is configured so as to provide a platooning driving mode for the motor vehicle 10. The platoon driving mode may be performed for example on the basis of data from the systems 12-28. In the platoon driving mode, the motor vehicle 10 is part of a vehicle platoon. The vehicle platoon is formed by bidirectional communication between the individual motor vehicles of the vehicle platoon and is led by a lead vehicle. The motor vehicles in the vehicle platoon are electronically coupled to one another. In the vehicle platoon, it is possible to set very short distances (for example less than 10 metres) between following vehicle and vehicle driving in front.

Figure 2:
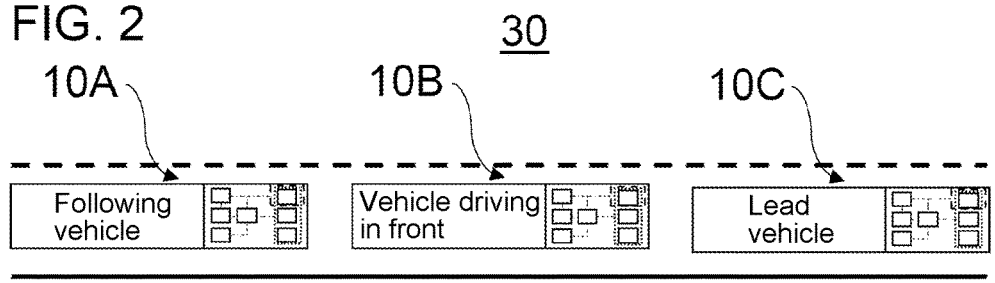
FIG. 2 shows a schematic plan view of a vehicle platoon in accordance with the present disclosure.

FIG. 2 shows a vehicle platoon 30. The vehicle platoon 30 is formed from three motor vehicles 10A, 10B and 10C, by way of example. The motor vehicles 10A-10C may be designed in accordance with the motor vehicle 10 from FIG. 1. For the sake of clarity, no reference signs for the systems 12-28 of the motor vehicles 10A-10C are indicated in FIG. 2.

Figure 3:
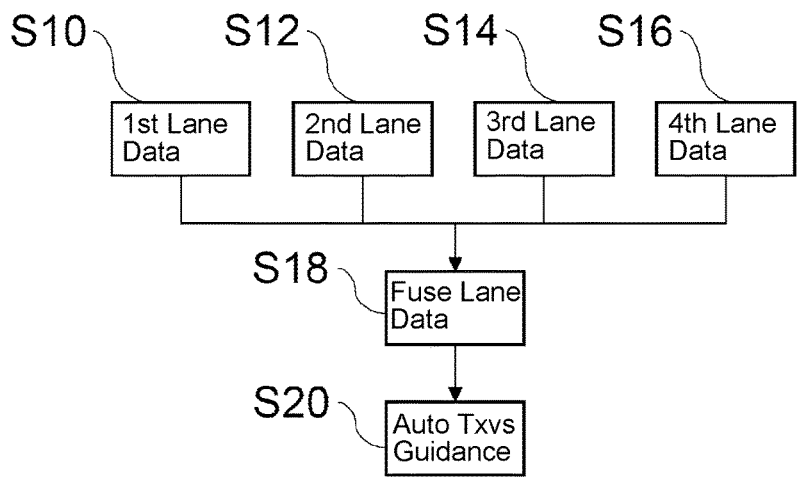
FIG. 3 shows a flowchart of a method for the automatic transverse guidance of a following vehicle in a vehicle platoon in accordance with the present disclosure.

A description is given below of one purely exemplary application of the target value determination method for the automatic transverse guidance of the following vehicle 10A in the vehicle platoon 30, with reference to FIGS. 1 to 3. The method may be performed at least partly by the control unit 22 of the following vehicle 10A and/or of the lead vehicle 10C.

In principle, lane data are initially determined from a plurality of different data sources in the method. The various lane data are then fused with one another to form a lane course. The lane data may in particular in each case be determined as mathematically modelled lane course hypotheses, for example in the form of polynomials or clothoid models. The fused lane course may then be determined as a mathematically modelled (main or reference) lane course hypothesis, for example from the first to fourth lane course hypotheses, depending on availability, for example in the form of a polynomial or clothoid model. The transverse guidance of the following vehicle 10A is carried out on the basis of the fused lane course. If one or more of the data sources that are used is absent, then this may be compensated, for example by using the remaining data sources.

In a method step S10, first lane data are determined for example as a first lane course hypothesis from map information and position information of the following vehicle 10A. The following vehicle 10A is able to be located on the digital map of the navigation system 18 by way of the position that was determined by the satellite-assisted position determination system 16. The first lane data may comprise for example a target traffic lane of the following vehicle 10 and a relative position and a relative angle with respect to the target trajectory in the traffic lane, in particular also in relation to the lane boundary on both sides.

In a method step S12, second lane data are determined for example as a second lane course hypothesis from a detection of lane markings by the lane marking detection system 12 of the following vehicle 10A. The lane markings on the road may be detected by way of the camera system 24 of the following vehicle 10A and recognized by applying the image recognition method. Depending on the distance to the vehicle 10B driving in front, a length of the recognized lane markings may vary, down to zero in the extreme case.

In a method step S14, third lane data are determined for example as a third lane course hypothesis from object tracking detection of the vehicle 10B, driving in front, of the vehicle platoon 30. The object tracking detection system 14 is used for the object tracking detection (object tracking). Said system is able to track a changing relative distance to the vehicle 10B driving in front through sensor fusion of the camera system 24, of the radar system 26 and/or of the lidar system 28. On the basis of a plurality of determined temporally consecutive relative distances, it is possible to determine a previous trajectory of the vehicle 10B driving in front and to estimate (for example extrapolate) a future trajectory of the vehicle 10B driving in front, whose data may be used as the third lane data. Depending on the configuration of the object tracking detection system 14, it may also be possible to determine previous and/or future estimated trajectories for a plurality of vehicles driving in front. In relation to the exemplary embodiment, this means that the object tracking detection system 14 of the following vehicle 10A is able to determine a previous and/or future estimated trajectory both for the vehicle 10B driving in front and for the lead vehicle 10C.

In a method step S16, fourth lane data are determined for example as a fourth lane course hypothesis from a detection of lane markings by the lane marking detection system 12 of the lead vehicle 10C. The lane markings on the road may be detected by way of the camera system 24 of the lead vehicle 10C and recognized by applying the image recognition method. A length of the recognized lane markings in the case of the fourth lane data is typically longer than in the case of the second lane data, since the lead vehicle 10C is the frontmost vehicle of the vehicle platoon 30.

In method step S16, the fourth lane data may be transmitted from the communication interface 20 of the lead vehicle 10C to the communication interface 20 of the following vehicle 10A.

A coordinate transformation may additionally be performed in the fourth method step S16 in order to relate the fourth lane data (for example in the form of the fourth lane hypothesis), which originally relate to the lead vehicle 10C, to the following vehicle 10A. The coordinate transformation may be performed for example by the control unit 22 of the lead vehicle 10C or of the following vehicle 10A on the basis of position information in relation to the lead vehicle 10C and to the following vehicle 10A.

Method steps S10 to S16 may for example be performed at the same time or at least partly temporally offset.

In a method step S18, the first to fourth lane data determined in method steps S10 to S16 are fused with one another. In particular, the first to fourth lane data present in the form of lane polynomials may be fused with one another or calculated in order to determine a fused lane course.

For the fusion, the first to fourth lane data (for example lane hypotheses) may be weighted. Particularly reliable and/or precise lane data may thus be assigned a higher weight than other lane data. Lane data having a higher weight than other lane data have a greater share or influence on the determination of the fused lane course. It is also possible for the weights to be changeable, for example dependent on a determined quality for the respective lane data. The weights may for example be changeable within a predetermined range.

By way of example, a first weight for the first lane data may be based inter alia on a number of available satellites for position determination by way of the position determination system 16. The position determination system 16 may additionally provide feedback about the integrity of the detected position, in particular in relation to the data received from the satellites. The feedback may be incorporated into the first weight. It is also possible for the use of a particularly accurate differential global positioning system (for example DGPS) by the position determination system 16 to be possible, for example sectionally. The first weight may be increased, for example by a predetermined value, for the duration of the use of the differential global positioning system. It is also possible for the first weight additionally or alternatively to be formed depending on a resolution of the map information available through the navigation system 18. The greater a number of available satellites, the greater the reported integrity, the longer the use of a differential global positioning system and/or the higher the resolution of the map information, the greater the first weight may be.

A second weight for the second lane data may expediently be determined on the basis of a distance between the following vehicle 10A and the vehicle 10B, driving directly in front, of the vehicle platoon 30. The distance may have a direct influence on the field of view of the camera system 24 of the following vehicle 10A. In the case of a large distance between the following vehicle 10A and the vehicle 10B driving in front, the field of view of the camera system 24 may hardly be covered by the vehicle 10B driving in front. In the case of a large distance, a detectable length of the lane markings may therefore be comparatively long. In the case of a short distance between the following vehicle 10A and the vehicle 10B driving in front, the field of view of the camera system 24 may be covered by the vehicle 10B driving in front. A detectable length of the lane markings may therefore be comparatively short. It is also possible for the lane markings not to be detectable at all due to the coverage. By way of example, the detectable or detected length of the lane markings may be used to form the second weight. The longer the length of the lane markings, the greater the distance between the following vehicle 10A and the vehicle 10B driving in front and/or the larger the field of view of the camera system 24 of the following vehicle 10A, the greater the second weight may be.

By way of example, a third weight for third lane data may be based on a number of evaluated systems of the object tracking detection system 14. The third weight may furthermore for example be formed depending on a length of the determined previous and/or future estimated trajectory of the vehicle 10B driving in front, on a number of measurement points for determining the trajectory (trajectories) and/or on a determination of a change of direction of travel signal from the one or more vehicles driving in front. The more sensors or systems are used or are able to be used by the object tracking detection system 14, the longer the determined trajectory (trajectories) is (are) and/or the greater the number of measurement points, the higher the third weight may be.

By contrast, the detection of a change of direction of travel signal, for example an external change of direction of travel indicator (for example indicator light) from the vehicle 10B driving in front, may reduce the third weight, for example as far as 0. It is therefore able to be ensured that, if the vehicle 10B driving in front changes lane, that is to say pulls out of the vehicle platoon 30, the following vehicle 10A does not at least partly follow in an undesired manner. Instead of this, it is able to be determined that the following vehicle 10A catches up with the next vehicle driving in front, here the lead vehicle 10C, and reduces a distance to a predetermined distance in order to keep the vehicle platoon 30.

By way of example, a fourth weight for the fourth lane data may be determined on the basis of a distance between the lead vehicle 10C and a vehicle (not shown) driving in front thereof, outside the vehicle platoon 30. The distance may again have a direct influence on the field of view of the camera system 24 of the lead vehicle 10C, similarly to the exemplary determination of the second weight. The longer the length of the detected or detectable lane markings, the greater the distance between the lead vehicle 10C and the vehicle (not shown) driving in front and/or the larger the field of view of the camera system 24 of the lead vehicle 10C, the greater the fourth weight may be. The availability or quality of the car-to-car communication used for the transmission may also be incorporated into the calculation of the weights.

On the basis of the fused lane course determined in method step S18, automated transverse guidance of the following vehicle 10A takes place in method step S20. The automated transverse guidance may comprise for example keeping a predetermined relative distance from a lane boundary of the fused lane course. The automated transverse guidance may also for example comprise keeping a central position in the fused lane course. The transverse guidance may comprise specifying a steering angle for the following vehicle 10A. The steering angle may be set by way of a steering actuator (not illustrated) of the following vehicle 10A.

The present disclosure is not restricted to the preferred exemplary embodiments described above. In fact, numerous variants and modifications are possible which likewise make use of the concepts described herein and thus fall within the scope of protection. In particular, the present disclosure also claims protection for the subject matter and the features of the dependent claims independently of the claims to which reference is made. In particular, the features of independent Claim 1 are disclosed independently of one another. In addition, the features of the dependent claims are also disclosed independently of all of the features of independent Claim 1 and for example independently of the features in relation to the presence and/or the performance of the determination of first lane data, of the determination of second lane data, of the determination of third lane data, of the determination of fourth lane data, of the determination of a lane course and of the transverse guidance of the following vehicle of independent Claim 1.

LIST OF REFERENCE SIGNS

10 Motor vehicle
10A Following vehicle
10B Vehicle driving in front
10C Lead vehicle
12 Lane marking detection system
14 Object tracking detection system
16 Position determination system
18 Navigation system
20 Communication interface
22 Control unit
24 Camera system
26 Radar system
28 Lidar system
30 Vehicle platoon
S10-S20 Method steps

What is claimed is:

1. A method for automatic transverse guidance of a following vehicle in a moving vehicle platoon, comprising:
   determining first lane data from map information and position information of the following vehicle;
   determining second lane data from a detection of lane markings by the following vehicle;
   determining third lane data from object tracking detection of one or more vehicles, driving in front of the following vehicle and behind a lead vehicle, of the vehicle platoon by the following vehicle;
   receiving fourth lane data from the lead vehicle by way of vehicle-to-vehicle communication, the fourth lane data including a detection of lane markings by the lead vehicle of the vehicle platoon;
   determining a lane course on the basis of the first lane data, the second lane data, the third lane data and the fourth lane data; and
   providing transverse guidance of the following vehicle on the basis of the determined lane course,
   wherein the lane course is determined as a fused lane course from at least two of the first lane data, the second lane data, the third lane data, and the fourth lane data, and
   wherein the first lane data is weighted with a first weight, the second lane data is weighted with a second weight, the third lane data is weighted with a third weight, and the fourth lane data is weighted with a fourth weight in order to determine the lane course.

2. The method according to claim 1, wherein:
   the first lane data are determined as a mathematical model in the form of a first lane course hypothesis and/or of a clothoid model; and/or
   the second lane data are determined as a mathematical model in the form of a second lane course hypothesis and/or of a clothoid model; and/or
   the third lane data are determined as a mathematical model in the form of a third lane course hypothesis and/or of a clothoid model; and/or
   the fourth lane data are determined as a mathematical model in the form of a fourth lane course hypothesis and/or of a clothoid model; and/or
   the lane course is determined as a mathematical model in the form of a lane course hypothesis and/or of a clothoid model.

3. The method according to claim 2, wherein the first lane course hypothesis, the second lane course hypothesis, the third lane course hypothesis, the fourth lane course hypothesis, and/or the lane course hypothesis is in the form of a mathematical polynomial.

4. The method according to claim 1, wherein:
   the determined lane course is used as a target trajectory for automatic transverse guidance of the following vehicle.

5. The method according to claim 1, wherein determining the first lane data comprises:
   locating the following vehicle on a map by way of a satellite-assisted position determination system and/or of a navigation system of the following vehicle; and/or
   determining a traffic lane of the following vehicle and/or a position of the following vehicle in the traffic lane from the map information and the position information of the following vehicle.

6. The method according to claim 1, wherein determining the second lane data comprises:
   detecting lane markings and/or unmarked road boundaries by way of a camera-assisted lane marking detection system of the following vehicle; and
   applying image recognition in order to recognize lane markings and/or unmarked road boundaries on one or more recordings, captured by a lane marking detection system of the following vehicle.

7. The method according to claim 6, wherein the one or more recordings are of upcoming surroundings of the following vehicle.

8. The method according to claim 1, wherein determining the third lane data comprises:
   performing object tracking detection by way of object recognition of a sensor-fused, camera-assisted, lidar-assisted, radar-assisted and/or satellite position determination-assisted object tracking detection system of the following vehicle; and/or determining a previous and/or future estimated trajectory of both the lead vehicle and the one or more vehicles driving in front of the following vehicle and behind the lead vehicle; and/or detecting a transverse movement and/or a change of direction indication from the one or more vehicles driving in front.

9. The method according to claim 1, wherein determining the fourth lane data comprises:

detecting lane markings and/or unmarked road boundaries by way of a camera-assisted lane marking detection system of the lead vehicle; and applying image recognition in order to recognize lane markings and/or unmarked road boundaries on one or more recordings, captured by a lane marking detection system of the lead vehicle.

10. The method according to claim 9, wherein the one or more recordings are of upcoming surroundings of the lead vehicle.

11. The method according to claim 1, wherein:

the first weight, the second weight, the third weight and/or the fourth weight is determined by covariance matrices of filters that are respectively used in order to determine the respective lane data; and the first weight, the second weight, the third weight and/or the fourth weight is determined on the basis of a quality of the first lane data, of the second lane data, of the third lane data and/or of the fourth lane data, respectively.

12. The method according to claim 11, wherein the filters include Kalman filters.

13. The method according to claim 1, further comprising:

applying a coordinate transformation to the fourth lane data that relate to the lead vehicle for comparison with the first, second and third lane data that relate to the following vehicle.

14. The method according to claim 1, wherein the first weight for the first lane data, the second weight for the second lane data, the third weight for the third lane data and the fourth weight for the fourth lane data is changeable or unchangeable.

15. The method according to claim 14, wherein:

the first weight is determined on the basis of a number of available satellites, of a reported integrity of the position information of the following vehicle, of an availability of a differential global positioning system and/or of a resolution of the map information; and/or the second weight is determined on the basis of a distance between the following vehicle and a vehicle, driving directly in front of the following vehicle, of the vehicle platoon, of a size of a field of view, not covered by the vehicle driving directly in front, of a lane marking detection system of the following vehicle, of a detected length of the lane markings and/or of a detected presence of the lane markings.

16. The method according to claim 14, wherein:

the third weight is determined on the basis of a number of evaluated systems, of a length of a determined previous and/or future estimated trajectory of the one or more vehicles driving in front, of a number of measurement points and/or of a detection of a change of direction signal from the one or more vehicles driving in front; and/or the fourth weight is determined on the basis of a distance between the lead vehicle and a vehicle driving directly in front of the lead vehicle, of a size of a field of view, not covered by the vehicle driving directly in front, of a lane marking detection system of the lead vehicle, of a detected length of the lane markings and/or of a detected presence of the lane markings.

17. A motor vehicle comprising:

a navigation system containing map information;

a camera-assisted, radar-assisted, lidar-assisted and/or satellite position determination-assisted object tracking detection system for the tracking detection of one or more vehicles, driving in front of the motor vehicle and behind a lead vehicle, of a vehicle platoon;

a communication interface for vehicle-to-vehicle communication with the lead vehicle to receive fourth lane data from a detection of lane markings by the lead vehicle of the vehicle platoon; and a controller that is designed to execute instructions, which cause the controller to:

determine a position of the motor vehicle;

determine lane markings and/or unmarked road boundaries on a road detected by a lane marking detection system;

determine first lane data from the map information and the position of the motor vehicle;

determine second lane data from lane markings detected by the lane marking detection system;

determine third lane data from the tracking detection of the one or more vehicles of the vehicle platoon;

determine a lane course on the basis of the first lane data, the second lane data, the third lane data and the fourth lane data; and provide transverse guidance of the motor vehicle on the basis of the determined lane course, wherein the lane course is determined as a fused lane course from at least two of the first lane data, the second lane data, the third lane data, and the fourth lane data, and wherein the first lane data is weighted with a first weight, the second lane data is weighted with a second weight, the third lane data is weighted with a third weight and the fourth lane data is weighted with a fourth weight in order to determine the lane course.

18. The motor vehicle according to claim 17, wherein:

the motor vehicle is a utility vehicle; and/or the lane marking detection system is a camera-assisted lane marking detection system; and/or the object tracking detection system is a camera-assisted object tracking detection system.

* * * * *